US012516786B2

(12) United States Patent
Chow

(10) Patent No.: US 12,516,786 B2
(45) Date of Patent: Jan. 6, 2026

(54) BOOSTED LED STRING LIGHT

(71) Applicant: Kwok On Chow, Hong Kong (CN)

(72) Inventor: Kwok On Chow, Hong Kong (CN)

( * ) Notice: Subject to any disclaimer, the term of this patent is extended or adjusted under 35 U.S.C. 154(b) by 70 days.

(21) Appl. No.: 18/404,951

(22) Filed: Jan. 5, 2024

(65) Prior Publication Data

US 2024/0302006 A1    Sep. 12, 2024

(30) Foreign Application Priority Data

Mar. 8, 2023   (CN) .......................... 202320436860.4

(51) Int. Cl.

| | |
|---|---|
| *F21S 4/10* | (2016.01) |
| *F21V 23/00* | (2015.01) |
| *F21V 23/06* | (2006.01) |
| *H05B 45/38* | (2020.01) |
| *F21Y 115/10* | (2016.01) |
| *H05B 45/37* | (2020.01) |

(52) U.S. Cl.
CPC .............. *F21S 4/10* (2016.01); *F21V 23/007* (2013.01); *F21V 23/06* (2013.01); *H05B 45/38* (2020.01); *F21Y 2115/10* (2016.08); *H05B 45/37* (2020.01)

(58) Field of Classification Search
CPC . F21S 4/10; H05B 45/38; H05B 45/37; F21V 23/007; F21V 23/06; F21Y 2115/10
See application file for complete search history.

(56) References Cited

U.S. PATENT DOCUMENTS

| | | | | |
|---|---|---|---|---|
| 7,696,700 B2* | 4/2010 | Li | .......................... | H02M 7/062 |
| | | | | 315/312 |
| 8,461,770 B2* | 6/2013 | Ye | .......................... | H05B 45/00 |
| | | | | 315/188 |
| 9,781,792 B1* | 10/2017 | Janning | .................. | H05B 45/54 |
| 10,091,843 B1* | 10/2018 | Janning | .................. | H05B 45/10 |
| 10,605,415 B2* | 3/2020 | Xiong | ..................... | H05B 45/24 |
| 10,631,386 B1* | 4/2020 | McRae | ................ | H05B 47/155 |
| 11,371,691 B2* | 6/2022 | On | ........................ | F21V 17/164 |
| 11,703,193 B2* | 7/2023 | Ray | ..................... | F21V 23/0421 |
| | | | | 315/228 |
| 12,078,301 B2* | 9/2024 | Xiong | ..................... | F21V 29/70 |
| 12,313,247 B2* | 5/2025 | Deng | .................. | B23K 1/0016 |

(Continued)

FOREIGN PATENT DOCUMENTS

| | | | | | |
|---|---|---|---|---|---|
| CN | 221930187 U | * | 10/2024 | | |
| JP | 2012174508 A | * | 9/2012 | ............. | H05B 45/40 |
| WO | WO-2018172980 A1 | * | 9/2018 | ............. | H05B 45/44 |

*Primary Examiner* — Adam D Houston
(74) *Attorney, Agent, or Firm* — WPAT, PC

(57) ABSTRACT

Disclosed is a boosted LED string light, including an AC plug, a rectifier boosted circuit and a lamp group, the AC plug and one end of the rectifier boosted circuit are both connected to a main power supply circuit, and the other end of the rectifier boosted circuit is connected to the lamp group. Through the collaboration of the rectifier boosted circuit, the lamp group, AC plug and AC tail socket, the present disclosure changes two circuits of each light string into a single circuit, the rectifier boosted circuit is used to boost and rectify the circuit of the sting light, and the boosted voltage is higher than the voltage provided by the AC power supply and serves as the driving voltage of the string light, thereby reducing working current and power of the string light, and improving energy-saving effect.

9 Claims, 2 Drawing Sheets

(56) References Cited

U.S. PATENT DOCUMENTS

| | | | |
|---|---|---|---|
| 2010/0148694 A1* | 6/2010 | Chang | H05B 45/37 |
| | | | 315/294 |
| 2011/0309758 A1* | 12/2011 | Yu | H05B 45/46 |
| | | | 315/192 |
| 2012/0233854 A1* | 9/2012 | Yu | H05B 45/37 |
| | | | 29/825 |
| 2018/0224105 A1* | 8/2018 | Tsai | F21V 29/75 |
| 2018/0288843 A1* | 10/2018 | Sakai | H05B 45/40 |
| 2020/0271279 A1* | 8/2020 | Xiong | F21V 23/005 |
| 2020/0375002 A1* | 11/2020 | Das | H05B 45/355 |
| 2021/0062984 A1* | 3/2021 | Yu | F21V 23/023 |
| 2021/0080087 A1* | 3/2021 | On | F21V 23/002 |
| 2023/0109205 A1* | 4/2023 | Xiong | F21V 25/04 |
| | | | 315/127 |
| 2024/0093841 A1* | 3/2024 | Xiong | F21V 23/005 |
| 2024/0302006 A1* | 9/2024 | Chow | F21V 23/06 |
| 2024/0392957 A1* | 11/2024 | Chow | F21V 17/007 |

\* cited by examiner

BOOSTED LED STRING LIGHT

TECHNICAL FIELD

The present disclosure relates to the technical field of Christmas string lights, and in particular to a boosted LED string light.

BACKGROUND ART

LED string lights are mainly used for holiday and Christmas decoration, and can be directly immersed in water due to its feature of waterproof. Besides, light cords thereof are flexible and soft, allowing for bending at will. Featuring waterproof, environmentally friendly, low temperature, low power consumption, low voltage, long service life and wide application range, lamp groups can be woven into various shapes of string lights and adapt to difficult crafts. At present, when a string light is produced, it is necessary to add a current-limiting resistor between an LED weld leg and a wire, and each circuit has only a rectifier circuit without a filter circuit. Therefore, when to drive an LED lamp with an operating voltage of 3 V, at most 40 LED lamps can be driven; when to drive an LED lamp with an operating voltage of 2.2 V, at most 54 LED lamps can be driven, each lamp group requires two circuits, pins of 5-10 of 25 LED lamps on each circuit are welded with a ⅙ W or ⅛ W resistor to achieve the purpose of making the string light operated, and each lamp group requires 2 circuits connected in parallel, which increases the working current and the power consumption, resulting in poor energy-saving effect.

SUMMARY

An objective of the present disclosure is to provide a boosted LED string light, two circuits of each light string are changed into a single circuit, a rectifier boosted circuit is used to boost and rectify a circuit of the sting light, a boosted voltage is higher than an output voltage of the AC plug, such that working current is reduced and power of the string light is lowered, thereby achieving energy-saving effect, and the problems raised in the background art is solved.

In order to achieve the above objective, the present disclosure provides the following technical solution, a boosted LED string light, including an AC plug, a rectifier boosted circuit and a lamp group, where the AC plug is connected to a main power supply circuit, one end of the rectifier boosted circuit is connected to the main power supply circuit, the other end is connected to the lamp group, and when the AC plug is powered, current flows through the main power supply circuit and the rectifier boosted circuit to supply power to the lamp group.

Further, the AC plug is provided with two AC pins, the two AC pins correspond to an L terminal and an N terminal of alternating current (AC), an input voltage of the AC plug is AC 120V, the AC plug facilitates connection to an AC power supply, and the AC power supply powers the lamp group.

Further, the AC plug is connected to an AC tail socket, the AC tail socket is provided with two pin holes corresponding to the AC pins, and when the AC plug is plugged into the AC tail socket, the two pin holes are respectively connected to the two AC pins through a wiring harness; and a plurality of products in the present disclosure can be used, the AC plug of one of the products can be plugged into and conducted to the AC tail socket of another product thereof, such that one power supply can drive the plurality of products in the present disclosure to be powered for use.

Further, one end of the lamp group is connected to the rectifier boosted circuit, and the other end of the same is connected to the main power supply circuit, where the rectifier boosted circuit is specifically a rectifier filter circuit and includes a current-limiting resistor R5, a first rectifier tube D1 and a first capacitor C1, the first capacitor C1 is an electrolytic filter capacitor, the first capacitor C1 is connected in parallel with the current-limiting resistor R5, a positive electrode terminal of the first capacitor C1 is connected to an output terminal of the first rectifier tube D1, an input terminal of the first rectifier tube D1 is connected to the L terminal of the AC plug through the main power supply circuit, and a negative electrode terminal of the first capacitor C1 is connected to the N terminal of the AC plug through the main power supply circuit; and one end of the lamp group is connected to one end of the current-limiting resistor R5 and the positive electrode terminal of the first capacitor C1, respectively.

Further, a negative electrode loop circuit is arranged at a connection between the lamp group and the main power supply circuit, one end of the negative electrode loop circuit is connected to the lamp group, and the other end of the same is connected to both the main power supply circuit and the AC tail socket.

Further, the rectifier boosted circuit includes a first rectifier tube D1, a first capacitor C1, a second capacitor C2 and a second rectifier tube D12, where a positive electrode terminal of the first capacitor C1 is connected to an L terminal of the AC plug through the main power supply circuit, and a negative electrode terminal of the same is connected to both an input terminal of the first rectifier tube D1 and an output terminal of the second rectifier tube D12; an output terminal of the first rectifier tube D1 is connected to the N terminal of the AC plug through the main power supply circuit; an input terminal of the second rectifier tube D12 is connected to a negative electrode terminal of the second capacitor C2, and a positive electrode terminal of the second capacitor C2 is connected to the N terminal of the AC plug through the main power supply circuit; and two ends of the second capacitor C2 serve as a positive electrode and a negative electrode respectively of an output terminal of the rectifier boosted circuit, with a positive electrode of the second capacitor C2 being the positive electrode of the output terminal thereof, and a negative electrode of the second capacitor C2 being the negative electrode of the output terminal thereof.

Further, an input terminal of the lamp group is connected to the positive electrode terminal of the second capacitor C2, and an output terminal of the lamp group is connected to the negative electrode terminal of the second capacitor C2.

Further, the lamp group is an LED lamp group consisting of a plurality of LED lamps, at least one current-limiting resistor is arranged on both ends of the LED lamp group, and the current-limiting resistor plays a role in limiting current in the circuit, so as to ensure normal operation of the lamp group.

Compared with the prior art, the present disclosure has the following beneficial effect:

1. Through the collaboration of the rectifier boosted circuit, the lamp group, AC plug and AC tail socket, the present disclosure changes two circuits of each light string into a single circuit, the rectifier boosted circuit is used to boost and rectify the circuit of the sting light, the boosted voltage is higher than the voltage provided by the AC power supply and serves as the driving voltage of the string light, such that the working current of the string light is reduced and the power is accordingly lowered, thereby achieving energy-saving effect of the string light.

2. The present disclosure modifies the connection of the current-limiting resistors to the rectifier boosted circuit, the LED lamps of the string light are increased to be more than 50 lamps, thereby effectively reducing the number of current-limiting resistors welded in the production of the string light, and reducing the production cost of the string light and the material cost of the current-limiting resistors.

Figure 1:
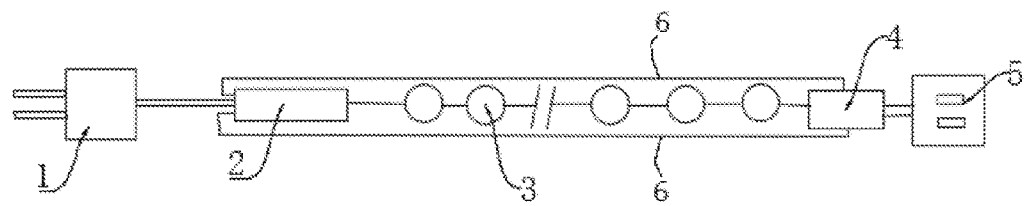
FIG. 1 is a structural schematic diagram of Embodiment 1 in the present disclosure.

Reference numerals in the drawings: 1. AC plug; 2. rectifier boosted circuit; 3. lamp group; 4. negative electrode loop circuit; 5. AC tail socket; and 6. main power supply circuit.

DETAILED DESCRIPTION OF THE EMBODIMENTS

The technical solutions in the embodiments of the present disclosure are described below clearly and comprehensively in conjunction with the accompanying drawings in the embodiments of the present disclosure. It is obvious that the embodiments described are merely a part of, not all of, embodiments of the present disclosure. All other embodiments obtained by those of ordinary skill in the art based on the embodiments of the present disclosure without making creative efforts fall within the scope of protection of the present disclosure.

Figure 2:
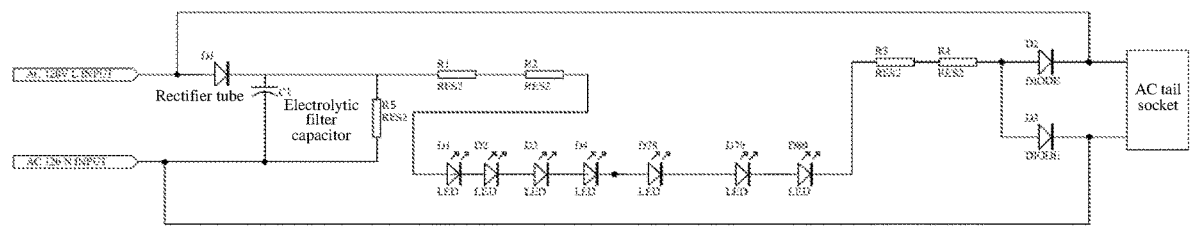
FIG. 2 is a circuit diagram of Embodiment 1 in the present disclosure.

With reference to FIGS. 1-2, the present disclosure provides a boosted LED string light, including an AC plug 1, a rectifier boosted circuit 2 and a lamp group 3, where the AC plug 1 is connected to a main power supply circuit 6, one end of the rectifier boosted circuit 2 is connected to the main power supply circuit 6, and the other end is connected to the lamp group 3; and when the AC plug 1 is powered, current flows through the main power supply circuit 6 and the rectifier boosted circuit 2 to supply power to the lamp group 3.

Specifically, the lamp group 3 is an LED lamp group consisting of a plurality of LED lamps, a first current-limiting component is arranged on one end of the LED lamp group, and a second current-limiting component is arranged on the other end thereof.

Further, the number of the LED lamps of the LED lamp group ranges from 50 to 80, the first current-limiting component includes a first resistor R1 and a second resistor R2, the second current-limiting component includes a third resistor R3 and a fourth resistor R4, the first resistor R1, the second resistor R2, the third resistor R3 and the fourth resistor R4 are all current-limiting resistors and all play a role in limiting current in the circuit, such that the current passing through the lamp group 3 does not exceed a rated value or a specified value required for actual work, so as to ensure normal operation of the lamp group 3.

Specifically, the AC plug 1 is provided with two AC pins, the two AC pins correspond to an L terminal and an N terminal of alternating current (AC), an input voltage of the AC plug 1 is AC 120V, and the setting of the AC pins facilitates the connection of the AC plug 1 with an AC power supply, and the supply of power to the lamp group 3.

Further, the AC plug 1 is connected to an AC tail socket 5, the AC tail socket 5 is provided with two pin holes corresponding to the AC pins, and when the AC plug 1 is plugged into the AC tail socket 5, the two pin holes are respectively connected to the two AC pins through a wiring harness; and a plurality of products in the present disclosure can be used, the AC plug 1 of one of the products can be plugged into and conducted to the AC tail socket 5 of another product thereof, such that one power supply can drive the plurality of products in the present disclosure to be powered for use.

With reference to FIGS. 1-2, Embodiment 1 of the present disclosure is described as below:

specifically, one end of the lamp group 3 is connected to the rectifier boosted circuit 2, and the other end of the same is connected to the main power supply circuit 6, where the rectifier boosted circuit 2 is specifically a rectifier filter circuit and includes a first rectifier tube D1, a first capacitor C1 and a current-limiting resistor R5, the first capacitor C1 is an electrolytic filter capacitor, the first capacitor C1 is connected in parallel with the current-limiting resistor R5, a positive electrode terminal of the first capacitor C1 is connected to an output terminal of the first rectifier tube D1, an input terminal of the first rectifier tube D1 is connected to the L terminal of the AC plug 1 through the main power supply circuit 6, and a negative electrode terminal of the first capacitor C1 is connected to the N terminal of the AC plug 1 through the main power supply circuit 6; and one end of the lamp group 3 is connected to one end of the current-limiting resistor R5 and the positive electrode terminal of the first capacitor C1, respectively, and the current-limiting resistor R5 is connected to the rectifier boosted circuit 2 to facilitate current limiting of the entire rectifier boosted circuit.

Figure 3:
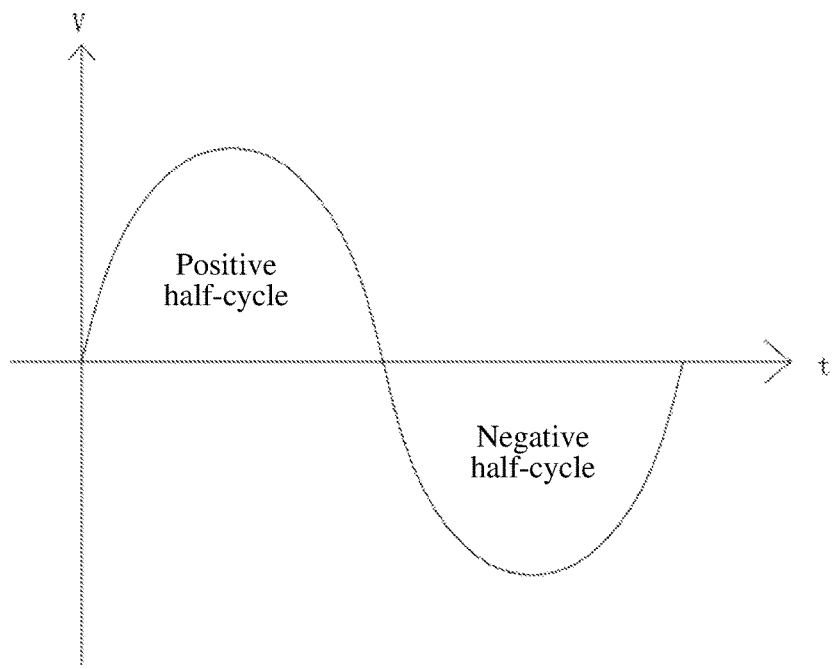
FIG. 3 is a voltage schematic diagram of a positive half-cycle voltage and a negative half-cycle voltage of Embodiments 1 and 2 in the present disclosure.

As shown in FIGS. 2-3, when the power supply emits a positive half-cycle voltage, current flows out from the L terminal of the AC plug 1, flows through the first rectifier tube D1, the first capacitor C1 and the lamp group 3, and flows to the main power supply circuit 6 and then to the N terminal of the AC plug 1, at that time, the first capacitor C1 is charged until the voltage of the first capacitor C1 approaches a peak value, and the value is then kept basically unchanged; and when the power supply emits a negative half-cycle voltage, current flows out from the N terminal of the AC plug 1, flows through the current limiting resistor R5 and the lamp group 3, and then flows to the main power supply circuit 6 and then to the L terminal of the AC plug 1. At the same time, the first capacitor C1 is in a discharge state, and the current flows out from the positive electrode terminal of the first capacitor C1, flows through the lamp group 3 and to the main power supply circuit 6 and then to the L terminal of the AC plug 1, such that a voltage of the lamp group 3 is increased, thereby effectively reducing working current of the lamp group and power consumption of the string light, and accordingly improving the energy-saving effect of the string light.

Specifically, as shown in FIG. 2, a negative electrode loop circuit 4 is arranged at a connection between the lamp group 3 and the main power supply circuit 6, an input terminal of the negative electrode loop circuit 4 is connected to the lamp group 3, and an output terminal of the same is connected to both the main power supply circuit 6 and the AC tail socket 5;

it should be noted that the output terminal of the negative electrode loop circuit 4 is connected to the L terminal and N terminal of the AC plug 1 through the main power supply circuit 6 through the wiring harness, and the negative electrode loop circuit 4 is further connected to the L terminal and the N terminal of the AC tail socket 5 through the wiring harness; and further, the negative electrode loop circuit 4 includes a first diode D2 and a second diode D3 connected in parallel, one end of the lamp group 3 is connected to input terminals of both the first diode D2 and the second diode D3, the other end of the first diode D2 is connected to both the N terminal of the AC plug 1 and the N terminal of the AC tail socket 5, and the other end of the second diode D is connected to both the L terminal of the AC plug 1 and the L terminal of the AC tail socket 5; and characteristics of forward conduction and reverse cutoff of the first diode D2 and the second diode D3 are utilized to protect the circuit loop and avoid current backflow.

By serially combining the rectifier boosted circuit 2, the first current-limiting component and the second current-limiting component, the voltage of the lamp group 3 is increased, such that the LED lamps are increased to be more than 50 lamps, thereby effectively reducing the number of current-limiting resistors welded in the production of the string light, and reducing the production cost of the string light and the material cost of the current-limiting resistors.

Figure 4:
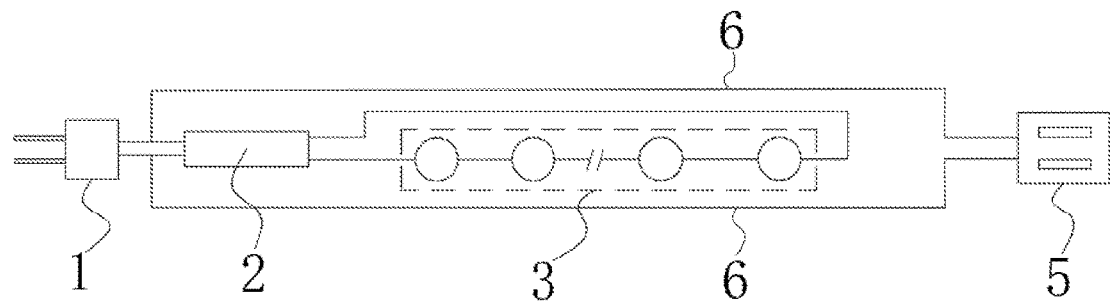
FIG. 4 is a structural schematic diagram of Embodiment 2 in the present disclosure.
Figure 5:
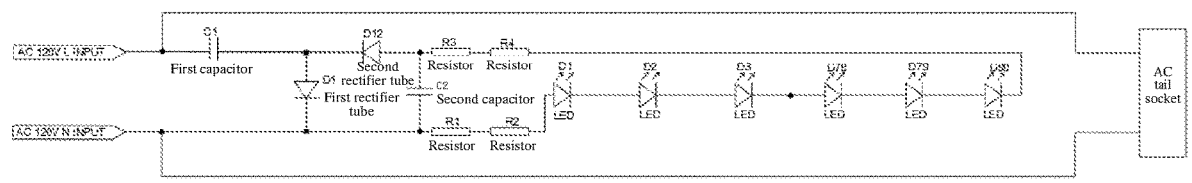
FIG. 5 is a circuit diagram of Embodiment 2 in the present disclosure.
Figure 6:
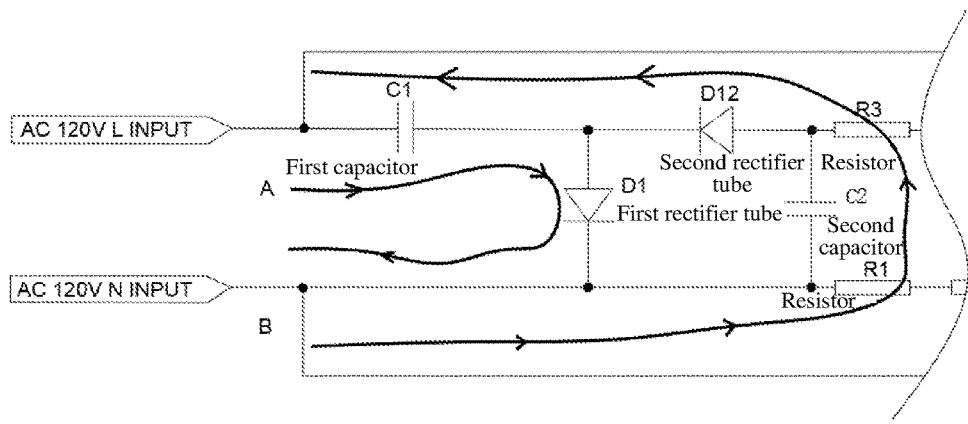
FIG. 6 is a current flow diagram of Embodiment 2 in the present disclosure.

With reference to FIGS. 4-6, Embodiment 2 of the present disclosure is described as below:

specifically, the rectifier boosted circuit 2 includes a first rectifier tube D1, a first capacitor C1, a second capacitor C2 and a second rectifier tube D12, where a positive electrode terminal of the first capacitor C1 is connected to an L terminal of the AC plug 1 through the main power supply circuit 6, and a negative electrode terminal of the same is connected to both an input terminal of the first rectifier tube D1 and an output terminal of the second rectifier tube D12; an output terminal of the first rectifier tube D1 is connected to the N terminal of the AC plug 1 through the main power supply circuit 6; an input terminal of the second rectifier tube D12 is connected to a negative electrode terminal of the second capacitor C2, and a positive electrode terminal of the second capacitor C2 is connected to the N terminal of the AC plug 1 through the main power supply circuit 6; and two ends of the second capacitor C2 serve as a positive electrode and a negative electrode respectively of an output terminal of the rectifier boosted circuit 2, with a positive electrode of the second capacitor C2 being the positive electrode of the output terminal thereof, and a negative electrode of the second capacitor C2 being the negative electrode of the output terminal thereof; and as shown in FIG. 6, when the power supply emits a positive half-cycle voltage, current A flows out from the L terminal of the AC plug 1 through the main power supply circuit 6, flows through the first capacitor C1 and the first rectifier tube D1, and flows to the main power supply circuit 6, and finally flows back to the N terminal of the AC plug 1, at that time, the first capacitor C1 is charged until the voltage of the first capacitor C1 approaches a peak value, and the value is then kept basically unchanged; and when the power supply emits a negative half-cycle voltage, current B flows out from the N terminal of the AC plug 1, flows through the main power supply circuit 6 and then sequentially through the second capacitor C2, the second rectifier tube D12 and the first rectifier tube D1, then flows to the main power supply circuit 6, and finally flows back to the L terminal of the AC plug 1, at that time, the second capacitor C2 is charged, and at the same time, a voltage of the first capacitor C1 is added in series to a voltage of the power supply, causing voltages at two terminals of the second capacitor C2 to boost; when the power supply emits positive and negative half-cycle voltages, and the first capacitor C1 and the second capacitor C2 are repeatedly charged alternately or are connected in series with the power supply to achieve voltage boosting, such that brightness of the lamp group 3 is further increased, and working current of the lamp group 3 is reduced, thereby achieving energy-saving effect.

Further, an input terminal of the lamp group 3 is connected to the positive electrode terminal of the second capacitor C2, and an output terminal of the lamp group 3 is connected to the negative electrode terminal of the second capacitor C2;

as shown in FIG. 5, when the power supply emits a negative half-cycle voltage, current flows out from the N terminal of the AC plug 1, flows through the main power supply circuit 6 and then sequentially through the lamp group 3 and the second capacitor C2, collectively flows through the second rectifier tube D12 and the first capacitor C1 and then to the main power supply circuit 6, and finally flows back to the L terminal of the AC plug 1, at that time, the second capacitor C2 is in a charging state, a voltage of the first capacitor C1 is added in series to a voltage of the power supply, causing voltages at two terminals of the second capacitor C2 to boost, such that brightness of the lamp group 3 is further increased, and working current of the lamp group 3 is reduced, thereby achieving energy-saving effect; and when the power supply emits positive half-cycle voltage, the second capacitor C2 is in a discharge state, current flows out from the positive terminal of the second capacitor C2 through the lamp group 3, the second rectifier tube D12 and the first rectifier tube D1, then flows to the main power supply circuit 6, and finally flows back to the N terminal of the AC plug 1, at that time, the lamp group 3 is powered and emits light.

An innovative point of the present disclosure lies in: a rectifier boosted circuit is used, and the boosted voltage serves as a driving voltage of the lamp group, such that the working current of the string light can be effectively reduced according to the principle of $P=UI$, and the power of the string light is accordingly reduced, thereby improving the energy-saving effect of the string light.

Although the embodiments of the present disclosure have been shown and described, it should be understood that those of ordinary skill in the art may make various changes, modifications, replacements, and variations to these embodiments without departing from the principle and spirit of the present disclosure, and the scope of the present disclosure is limited by the appended claims and their equivalents.

What is claimed is:

1. A boosted LED string light, comprising an AC plug (1), a rectifier boosted circuit (2) and a lamp group (3), wherein the AC plug (1) is connected to a main power supply circuit (6), one end of the rectifier boosted circuit (2) is connected to the main power supply circuit (6), and the other end is connected to the lamp group (3); and when the AC plug (1) 1 is powered, the current flows through the main power supply circuit (6) and the rectifier boosted circuit (2) to supply power to the lamp group (3);

wherein the rectifier boosted circuit (2) is configured to rectify and generate a boosted voltage higher than an output voltage of the AC plug (1);

wherein an input terminal of the lamp group (3) is connected to the rectifier boosted circuit (2), and an output terminal of the lamp group (3) is connected to the main power supply circuit (6) through a negative electrode loop circuit (4), the negative electrode loop circuit (4) comprises a first diode D2 and a second diode D3, and the negative electrode loop circuit (4) is configured to protect circuit loop and avoid current backflow due to characteristics of forward conduction and reverse cutoff of the first diode D2 and the second diode D3, input terminals of the first diode D2 and the second diode D3 both are connected to the output terminal of the lamp group (3), an output terminal of the first diode D2 is connected to one of an L terminal and an N terminal of the AC plug (1), and an output terminal of the second diode D3 is connected to the other one of the L terminal and the N terminal of the AC plug (1).

2. The boosted LED string light according to claim 1, wherein the AC plug (1) is provided with two AC pins, the two AC pins correspond to an L terminal and an N terminal of alternating current (AC), an input voltage of the AC plug (1) is AC 120V, the AC plug (1) facilitates connection to an AC power supply, and the AC power supply powers the lamp group (3).

3. The boosted LED string light according to claim 2, wherein the AC plug (1) is connected to an AC tail socket (5), the AC tail socket (5) is provided with two pin holes corresponding to the AC pins, and when the AC plug (1) is plugged into the AC tail socket (5), the two pin holes are respectively connected to the two AC pins through a wiring harness; and a plurality of products in the present disclosure can be used, the AC plug (1) of one of the products can be plugged into and conducted to the AC tail socket (5) of another product thereof, such that one power supply can drive the plurality of products in the present disclosure to be powered for use.

4. The boosted LED string light according to claim 3, wherein the rectifier boosted circuit (2) is specifically a rectifier filter circuit and includes a current-limiting resistor R5, a first rectifier tube D1 and a first capacitor C1, the first capacitor C1 is an electrolytic filter capacitor, the first capacitor C1 is connected in parallel with the current-limiting resistor R5, a positive electrode terminal of the first capacitor C1 is connected to an output terminal of the first rectifier tube D1, an input terminal of the first rectifier tube D1 is connected to the L terminal of the AC plug (1) through the main power supply circuit (6), and a negative electrode terminal of the first capacitor C1 is connected to the N terminal of the AC plug (1) through the main power supply circuit (6); and the input terminal of the lamp group (3) is connected to one end of the current-limiting resistor R5 and the positive electrode terminal of the first capacitor C1, respectively.

5. A boosted LED string light, comprising an AC plug (1), a rectifier boosted circuit (2) and a lamp group (3), wherein the AC plug (1) is connected to a main power supply circuit (6), one end of the rectifier boosted circuit (2) is connected to the main power supply circuit (6), and the other end is connected to the lamp group (3); and when the AC plug (1) 1 is powered, the current flows through the main power supply circuit (6) and the rectifier boosted circuit (2) to supply power to the lamp group (3);

wherein the rectifier boosted circuit (2) is configured to rectify and generate a boosted voltage higher than an output voltage of the AC plug (1);

wherein the rectifier boosted circuit (2) includes a first rectifier tube D1, a first capacitor C1, a second capacitor C2 and a second rectifier tube D12, where a positive electrode terminal of the first capacitor C1 is connected to an L terminal of the AC plug (1) through the main power supply circuit (6), and a negative electrode terminal of the first capacitor C1 is connected to both an input terminal of the first rectifier tube D1 and an output terminal of the second rectifier tube D12; an output terminal of the first rectifier tube D1 is connected to an N terminal of the AC plug (1) through the main power supply circuit (6); an input terminal of the second rectifier tube D12 is connected to a negative electrode terminal of the second capacitor C2, and a positive electrode terminal of the second capacitor C2 is connected to the N terminal of the AC plug (1) through the main power supply circuit (6); and two ends of the second capacitor C2 serve as a positive electrode and a negative electrode respectively of an output terminal of the rectifier boosted circuit (2), with the positive electrode terminal of the second capacitor C2 being the positive electrode of the output terminal thereof, and the negative electrode terminal of the second capacitor C2 being the negative electrode of the output terminal thereof;

wherein an input terminal of the lamp group (3) is connected to the positive electrode terminal of the second capacitor C2 through a first current-limiting component including at least one resistor, and an output terminal of the lamp group (3) is connected to the negative electrode terminal of the second capacitor C2 through a second current-limiting component including at least one resistor.

6. The boosted LED string light according to claim 1, wherein the lamp group (3) is an LED lamp group consisting of a plurality of LED lamps, at least one current-limiting resistor is arranged on both ends of the LED lamp group, and the current-limiting resistor plays a role in limiting current in the circuit, so as to ensure normal operation of the lamp group (3).

7. The boosted LED string light according to claim 4, wherein when the AC power supply emits a positive half-cycle voltage, current flows out from the L terminal of the AC plug (1), flows through the first rectifier tube D1, the first capacitor C1 and the lamp group (3), and flows to the main power supply circuit (6) and then to the N terminal of the AC plug (1), at that time, the first capacitor C1 is charged until a voltage of the first capacitor C1 approaches a peak value, and the voltage is then kept basically unchanged; and when the AC power supply emits a negative half-cycle voltage, current flows out from the N terminal of the AC plug (1), flows through the current limiting resistor R5 and the lamp group (3), and then flows to the main power supply circuit (6) and then to the L terminal of the AC plug (1), at that time, the first capacitor C1 is in a discharge state, and current flows out from the positive electrode terminal of the first capacitor C1, flows through the lamp group (3) and to the main power supply circuit (6) and then to the L terminal of the AC plug (1), such that a voltage of the lamp group (3) is increased, thereby effectively reducing working current of the lamp group (3) and power consumption of the string light, and accordingly improving energy-saving effect of the string light.

8. The boosted LED string light according to claim 5, wherein when the AC power supply emits a negative half-cycle voltage, current flows out from the N terminal of the AC plug (1), flows through the main power supply circuit (6) and then through the lamp group (3) and the second capacitor C2, collectively flows through the second rectifier tube D12 and the first capacitor C1 and then to the main power supply circuit (6), and finally flows back to the L terminal of the AC plug (1), at that time, the second capacitor C2 is in a charging state, a voltage of the first capacitor C1 is added in series to a voltage of the AC power supply, causing voltages at the positive electrode terminal and the negative electrode terminal of the second capacitor C2 to boost, such that brightness of the lamp group (3) is further increased, and working current of the lamp group (3) is reduced, thereby achieving energy-saving effect; and when the AC power supply emits a positive half-cycle voltage, the second capacitor C2 is in a discharge state, current flows out from the positive electrode terminal of the second capacitor C2 through the lamp group (3), the second rectifier tube D12 and the first rectifier tube D1, then flows to the main power supply circuit (6), and finally flows back to the N terminal of the AC plug (1), at that time, the lamp group (3) is powered and emits light.

9. The boosted LED string light according to claim 6, wherein a number of the plurality of LED lamps of the LED lamp group ranges from 50 to 80.

* * * * *